(12) United States Patent
Eubank

(10) Patent No.: US 12,167,719 B2
(45) Date of Patent: Dec. 17, 2024

(54) FEED SPREADER INCLUDING PIVOTABLE CARGO TRANSPORT APPARATUS

(71) Applicant: Blake Hall Eubank, Whitney, TX (US)

(72) Inventor: Blake Hall Eubank, Whitney, TX (US)

(*) Notice: Subject to any disclaimer, the term of this patent is extended or adjusted under 35 U.S.C. 154(b) by 8 days.

(21) Appl. No.: 18/084,681

(22) Filed: Dec. 20, 2022

(65) Prior Publication Data

US 2024/0196858 A1 Jun. 20, 2024

(51) Int. Cl.
*A01K 5/02* (2006.01)
*B60D 1/02* (2006.01)

(52) U.S. Cl.
CPC .............. *A01K 5/0225* (2013.01); *B60D 1/02* (2013.01)

(58) Field of Classification Search
CPC ..... A01K 5/0225; A01K 5/0226; B65D 88/26
See application file for complete search history.

(56) References Cited

U.S. PATENT DOCUMENTS

| | | | | |
|---|---|---|---|---|
| 5,996,869 A * | 12/1999 | Belinky | ..................... | B60R 9/06 116/28 R |
| 7,347,390 B2 * | 3/2008 | Truan | ..................... | E01C 19/203 239/661 |
| 10,457,187 B1 * | 10/2019 | Nash | ..................... | B60R 9/06 |
| 2003/0164416 A1 * | 9/2003 | Sauls | ..................... | A01C 15/124 239/650 |
| 2006/0261111 A1 * | 11/2006 | McCoy | ..................... | B60R 9/065 224/526 |
| 2012/0305612 A1 * | 12/2012 | Bell, Jr. | ..................... | B60R 9/06 224/519 |
| 2013/0284832 A1 * | 10/2013 | Hernandez | ................ | B60R 9/06 224/502 |
| 2015/0181801 A1 * | 7/2015 | Niemela | .............. | A01C 17/001 119/51.01 |
| 2018/0064063 A1 * | 3/2018 | Jahns | .................... | A01K 5/0225 |
| 2019/0054482 A1 * | 2/2019 | Vogt | .................... | A01K 5/0225 |
| 2019/0090453 A1 * | 3/2019 | Dixon | .................. | A01K 5/0225 |
| 2019/0099779 A1 * | 4/2019 | Farmer | ................. | E01C 19/203 |

* cited by examiner

*Primary Examiner* — Brady W Frazier
*Assistant Examiner* — Edgar Reyes
(74) *Attorney, Agent, or Firm* — Jeffrey Roddy

(57) ABSTRACT

A feed spreader apparatus adapted to mount readily to a receiver hitch includes a feed hopper portion, a hinge assembly that permits the hopper to be pivoted from a first upright position to a second down position providing a platform adapted to transport cargo and unimpeded access to contents of the truck bed.

7 Claims, 12 Drawing Sheets

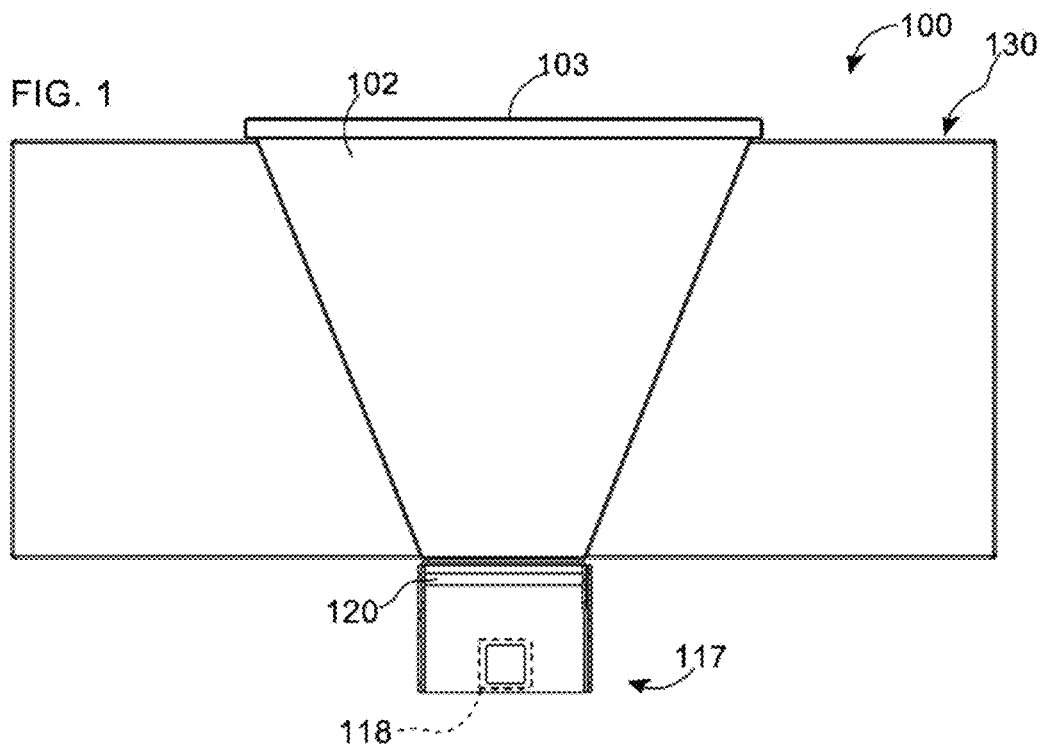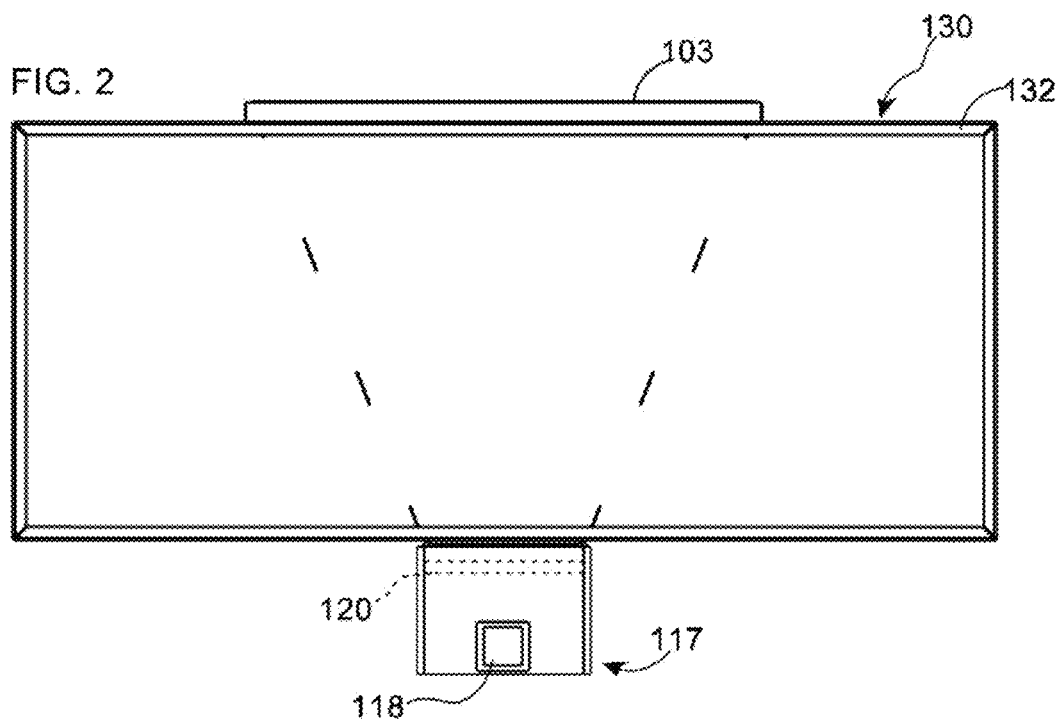

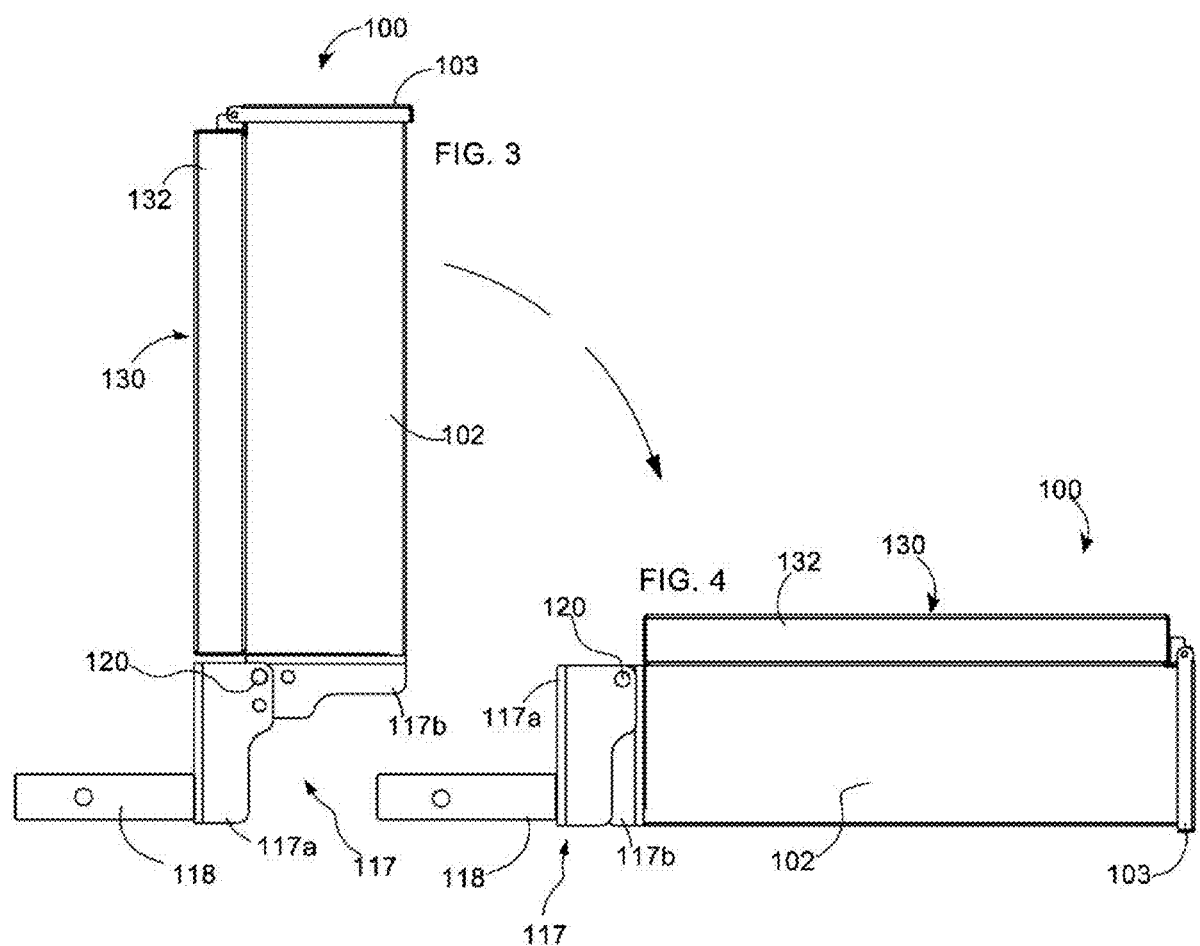

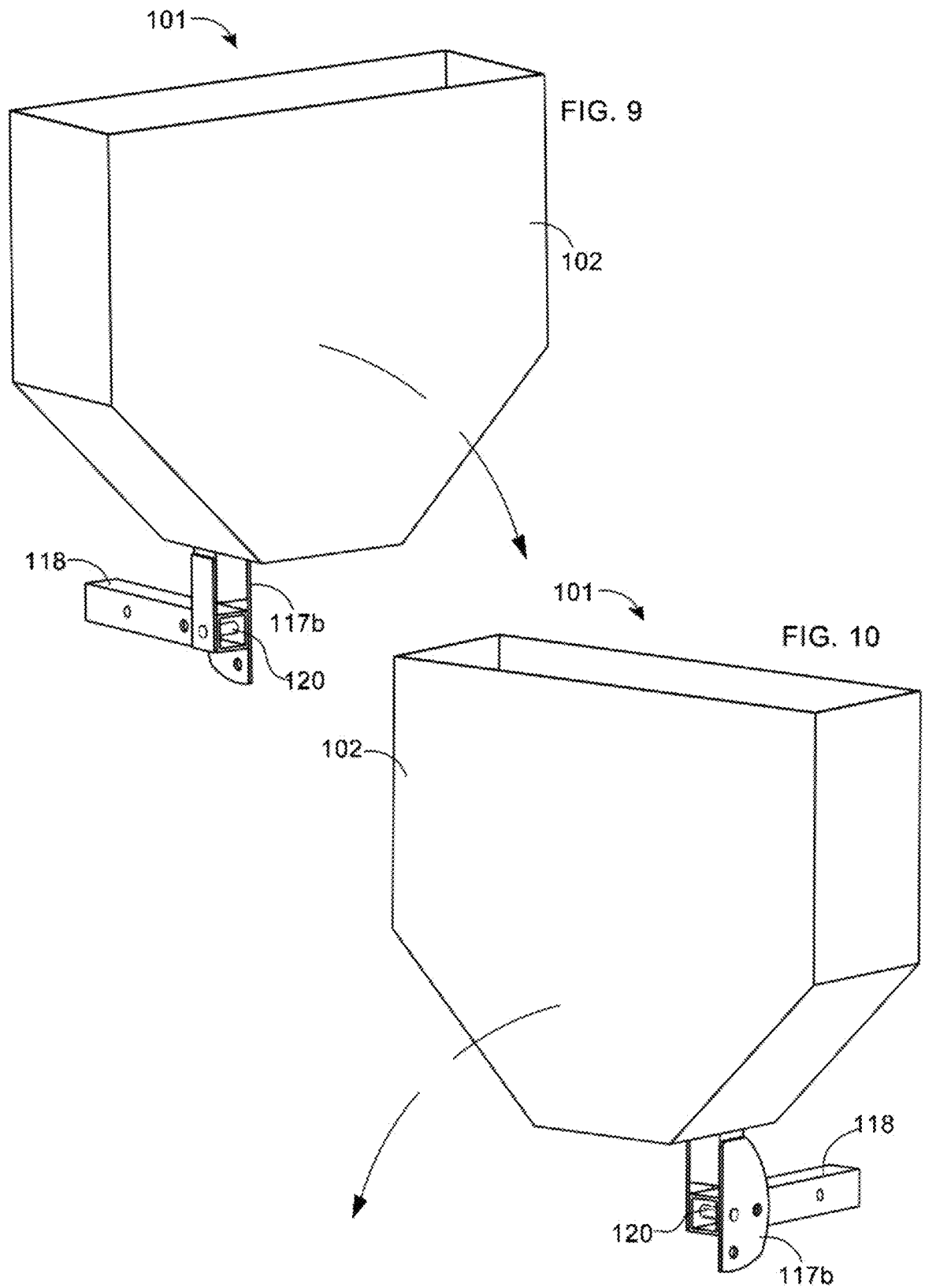

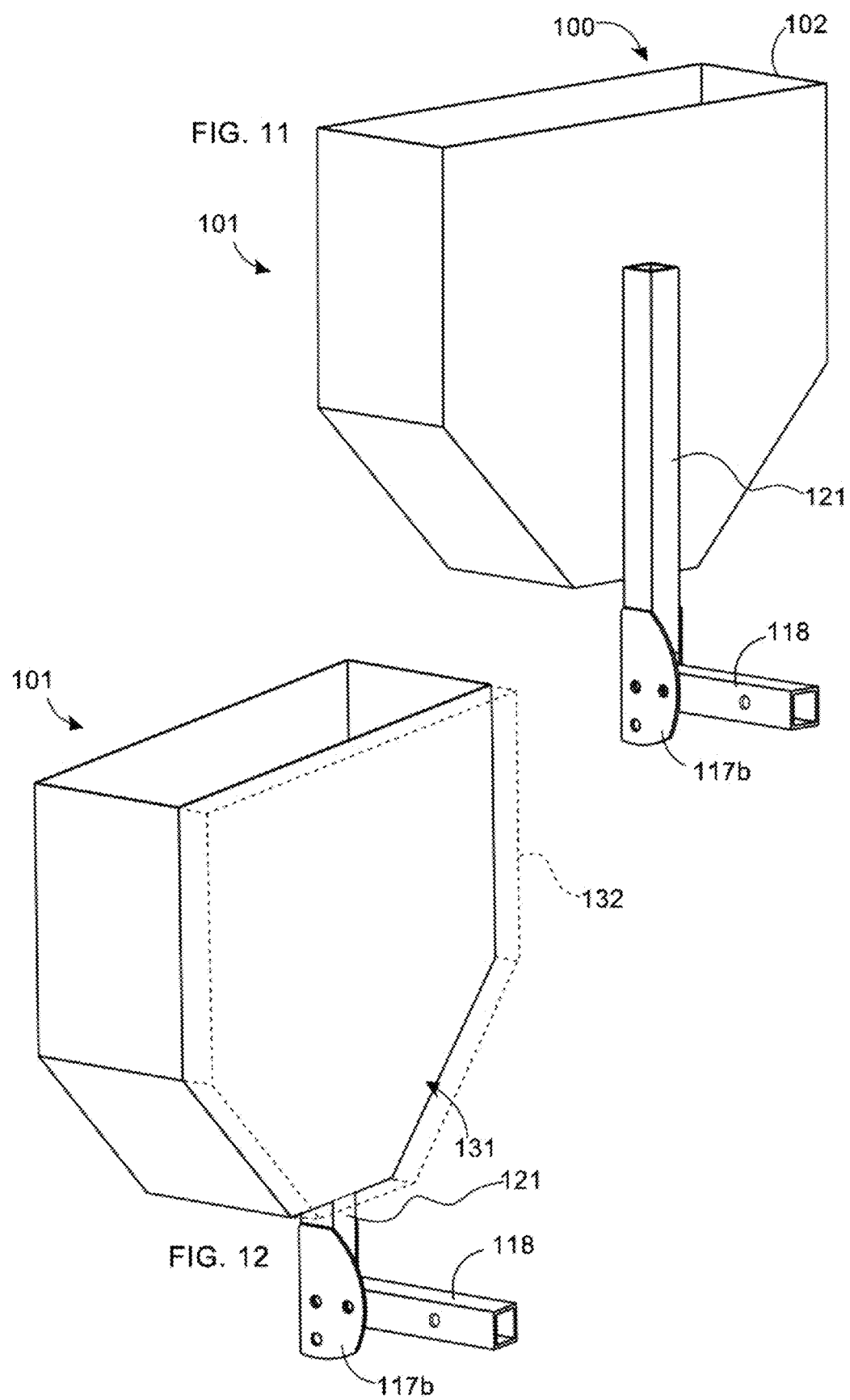

FEED SPREADER INCLUDING PIVOTABLE CARGO TRANSPORT APPARATUS

The present invention relates to animal feed dispersal.

BACKGROUND OF THE INVENTION

Mobile feed spreaders are long known in the art. Typically such feed spreaders include a hopper for holding the animal feed; e.g., corn, and a means to control the rate and amount of feed dispersed. Some spreaders may be integral with a purpose built truck or mountable to a general purpose utility vehicle. Mounting locations may include the truck bed, a receiver hitch or grill guard. Although past feed spreaders work well for their intended use, difficulties remain. For example, when past feed spreaders are mounted to the receiver hitch of a pick up truck, their placement can block access to the truck tail gate and may interfere with other tasks such as loading or unloading materials such as fence pipe, hay, salt licks, etc.

Accordingly, it would be desirable to provide a feed spreader that mounts readily to a receiver hitch, e.g., class III type, and permit access to truck bed contents without necessitating removal of the feed spreader.

It would be additionally desirable to provide a feed spreader that is configured to pivot to a position allowing placement of a truck tail gate in the down position.

Additionally, it would be even further desirable if such a feed spreader provided utility for cargo/material transport in addition to its feed dispersal function.

SUMMARY OF THE INVENTION

Example implementations described herein include a feed spreader. e.g., broadcast spreader, that is mountable to a trailer hitch and capable of at least two positions; a first position wherein the feed dispenser is placed upright and capable of gravity feeding material to an outlet for spreading purposes, and a second position wherein the feed dispenser faces downward and does not block the movement of a truck tail gate or interfere with access to the truck bed contents.

Additionally, in the second position, a substantially broad and flat platform is provided for transport of cargo/material.

In one example implementation according to the present invention, a feed spreader apparatus includes a hopper portion and a platform portion, the hopper portion and platform portion are configured to be secured in a first position where the hopper is capable of spreading feed or other particulate matter, and pivotable to a second position where the platform is adapted to receive and secure objects and articles for transport.

In an aspect combinable with the foregoing example implementation, the feed spreader apparatus includes a hinge assembly and a mount adapted for coupling to a class III receiver tube.

In an aspect combinable with any other aspect described herein, a mounting element of the feed spreader may include a post for insertion into a receiver tube which may be secured therein by a cross-pin.

BRIEF DESCRIPTION OF THE DRAWING FIGURES

FIG. 1 is a front side elevation of an example implementation according to the present invention;

FIG. 2 is a back side elevation of (FIG. 1) according to the present invention;

FIG. 3 is a left side view of the implementation in a first position;

FIG. 4 is a left side view of the thereof in a second position;

FIG. 9 is a left side perspective view of a second example implementation;

FIG. 10 is a right side perspective view thereof;

FIG. 11 is a perspective view showing a back side of a hopper portion thereof;

FIG. 12 is another perspective view showing a platform surface on a back side of the hopper;

REFERENCE LISTING OF THE NAMED ELEMENTS

Figure 5:
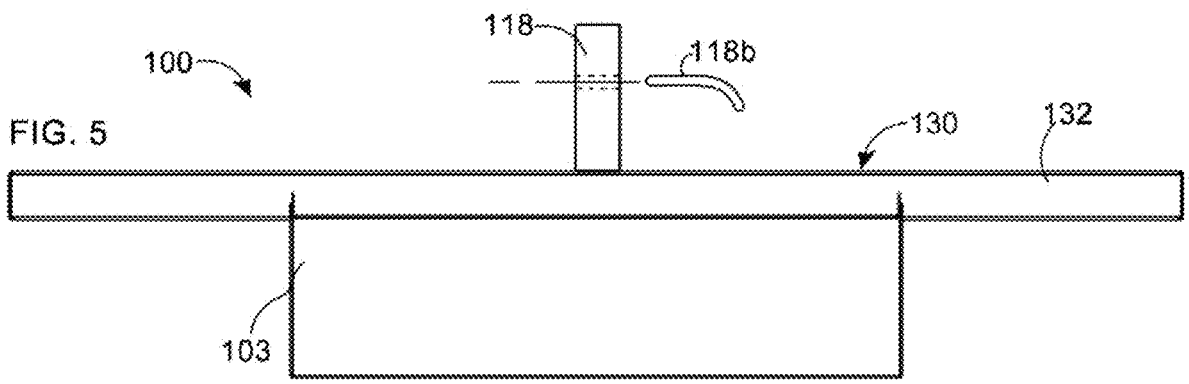
FIG. 5 is a top plan view thereof.

100, 101 feed dispensing apparatus
102 hopper portion
103 hopper lid
104 outlet
107 spreader mechanism
106 outlet gate member
108 disc spreader
109 disc fins
110 gate motor
111 outlet surround
112 motor screw
113 coil spring
114 wiring
115 motor shroud
116 motor stand
117 hinge assembly
117a fixed leaf
117b pivotable leaf
118 mounting post
118b receiver tube cross pin
119 alignable hinge locking aperture(s)
120 hinge pin
121 hopper connector post
124 position securing pin
130 platform portion
131 transport surface
132 raised border
134 tie-down apertures
136 apparatus first position
138 apparatus second position

DEFINITIONS

In the following description, the term "disperse" or "spread" refers generally to any type of feed or particulate dispersal at any rate or pattern of dispersal whether intermittent or continuous. The term "trailer hitch" includes class III type hitches but is intended to encompass other less common hitching systems. The term "spreader mechanism" is intended to encompass typical arrangements of electric motors, outlet gates/valves/retractable plugs, rotating discs and wired or wireless controllers that are conventionally employed to actuate feed spreader mechanisms from the interior of a vehicle as well as variations thereof that would be appreciated by those having skill in the art and access to this disclosure. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." In case of conflict, the present specification, including explanations of terms, will control. In addition, the materials, methods, and examples are illustrative only and not intended to be limiting. In the various implementations depicted herein, it is intended that any aspect, object or feature of an implementation can be interchanged or shared with any aspect, object or feature of any other implementation depicted herein.

Referring generally to FIGS. 1-18, implementations of a feed spreader (100, 101) shown include a hopper portion (102) a hopper lid (103), feed outlet (104), a hinge assembly (117) that includes a pivotable leaf (117b) connected to the hopper portion (102), and a fixed leaf (117a) connected to a mounting post (118) adapted to mount to a trailer hitch receiver tube. While typically, fixed and pivotable leaves are hingeably connected by hinge pin (120), in some implementations, a pair of co-axial bolts wherein each bolt of the pair forms the pivoting means for each leaf may be used in lieu of the bridging hinge pin (120) shown. In some implementations it is conceivable that in lieu of the mounting post (118), a short tubular member with an aperture sized and shaped to slip over the receiver tube (117a) may fit around the receiver tube and be secured thereon by a clamp or set screw (not shown). Furthermore, in cased employing a short tubular member, it is possible that a detachable mounting post with a flanged end may be insertable in the receiver tube once the short tubular member is placed over the receiver in order to inhibit sliding movement of the short tubular member atop the receiver tube. In the illustrated implementations employing a mounting post (120), the post is inserted inside a hitch receiver tube and secured in a similar manner to a ball mount. Irrespective of the mounting method, hopper portion (102) is pivotable via hinge assembly (117) from a first upright position (136) best shown in (FIG. 17) to a second position ((138), FIG. 18) generally at a right angle relative to the first position thereby providing a transport surface (131) of platform portion (130). In the second position (138) surface (131) is adapted for the placement of objects and articles for transport and the tail gate of a truck may be moved to a down position for unimpeded access to the truck bed contents/cargo, hence eliminating the need to remove the feed spreader. A Raised circumferential border/lip/ridge (132) with one or more tie-down apertures therein (134) may surround the platform portion (130). It is intended that the invention may include other tie-down elements not shown, such as bordering cleats, etc., as would be appreciated by those having skill in the art and access to this disclosure. Hopper portion (102) additionally includes a feed outlet (104) around which is an outlet surround (105) and a spreader mechanism (107) which includes an outlet gate member (106) which may be an electrically actuated flap, insert or plug connected to a screw shaft (122) of a motor (110) such that movement of the screw shaft induces the flap or plug to withdraw from the outlet and permit passage therethrough of feed, whereby rotatable disc (108) with fins (109) broadcasts the feed in a desired pattern. In order to better show the claimed features of the hopper (102) and hinge assembly (117), FIGS. 1-12 omit the spreader mechanism, which is then depicted in (FIGS. 15-18) where the feed spreader attached to a hitch receiver tube of a truck.

FIGS. 1 and 2 show respectively, front and rear side elevations of an example implementation. FIGS. 3 and 4 show respectively, a transition from an upright first position to a second position where the hopper is facing down and platform (130) is facing up and providing a surface (131) for transport of cargo.

Figure 6:
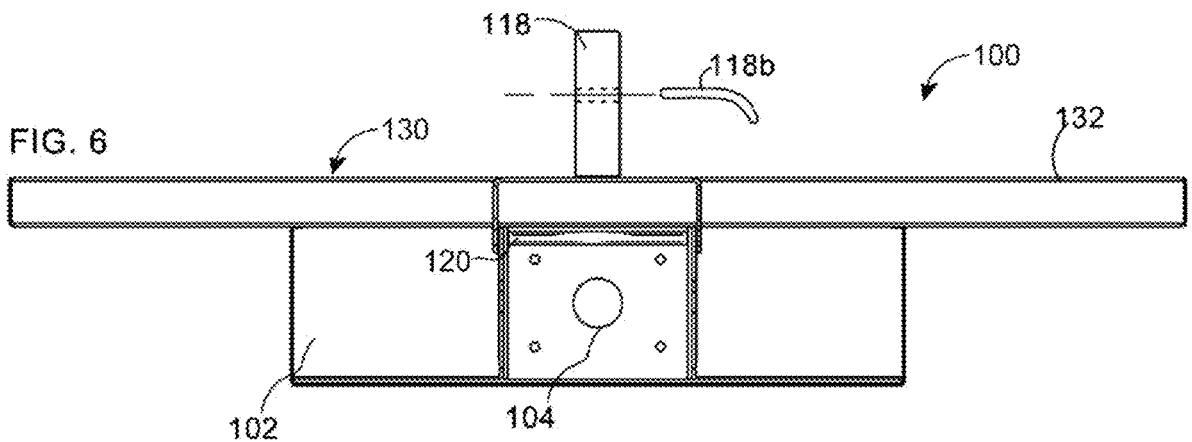
FIG. 6 is a bottom plan view thereof.
Figure 7:
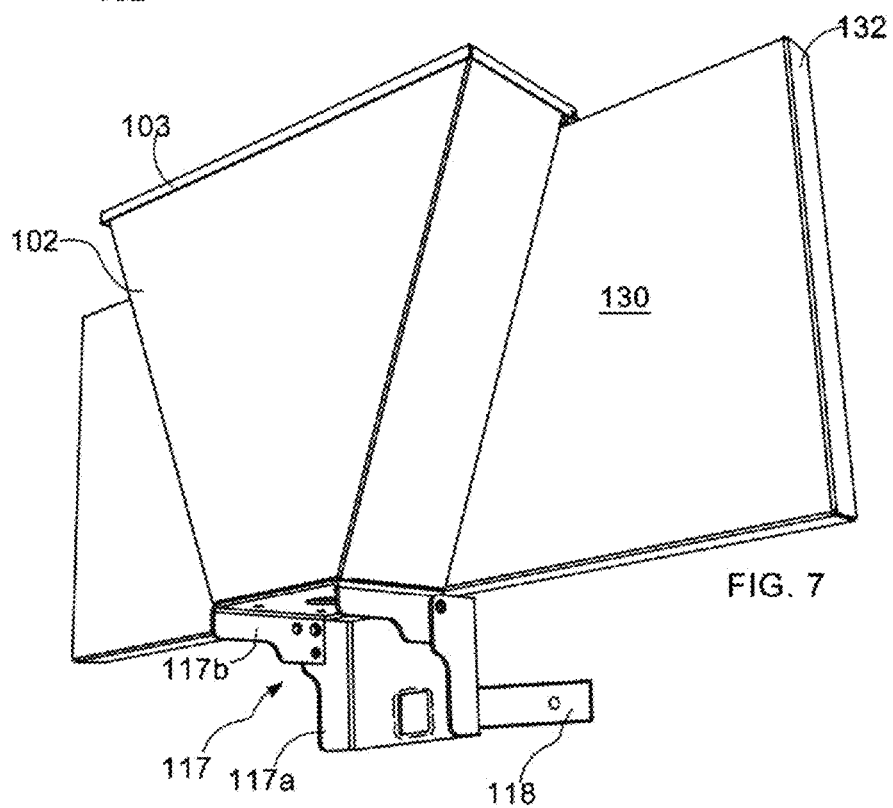
FIG. 7 is a perspective view showing a hopper portion, a platform portion and a hinge assembly.
Figure 8:
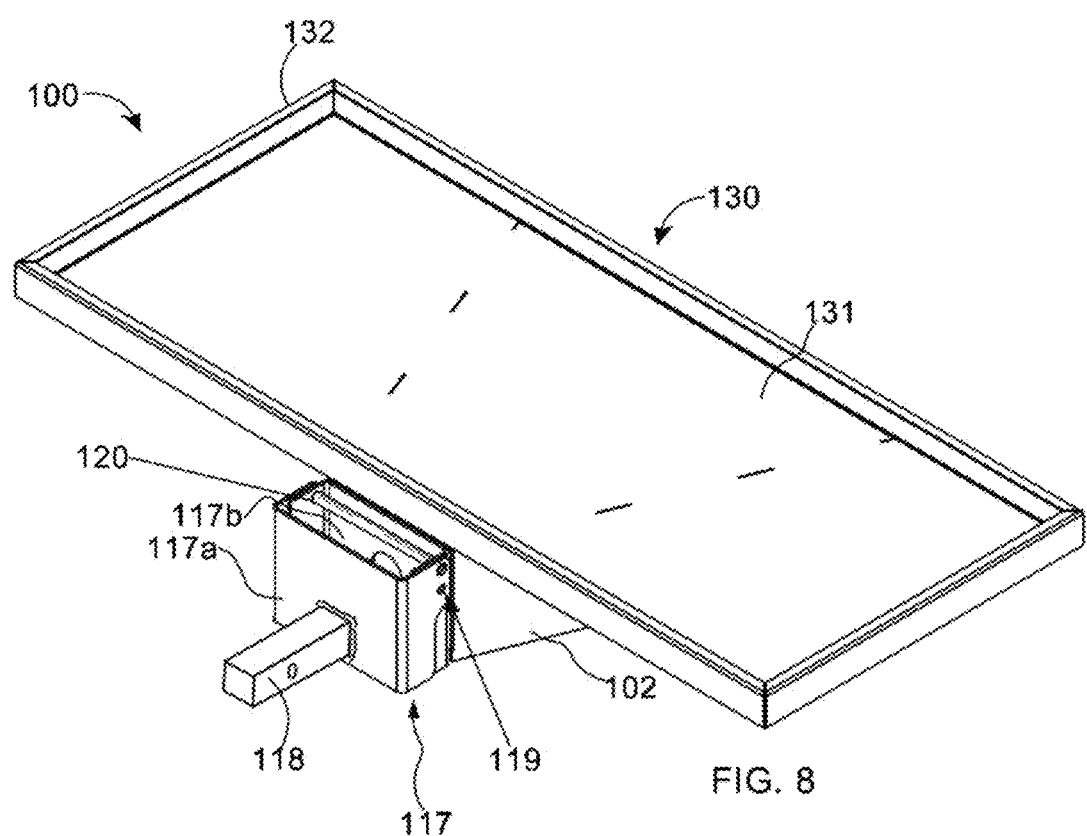
FIG. 8 is a perspective view showing a top side of the platform portion.
Figure 18:
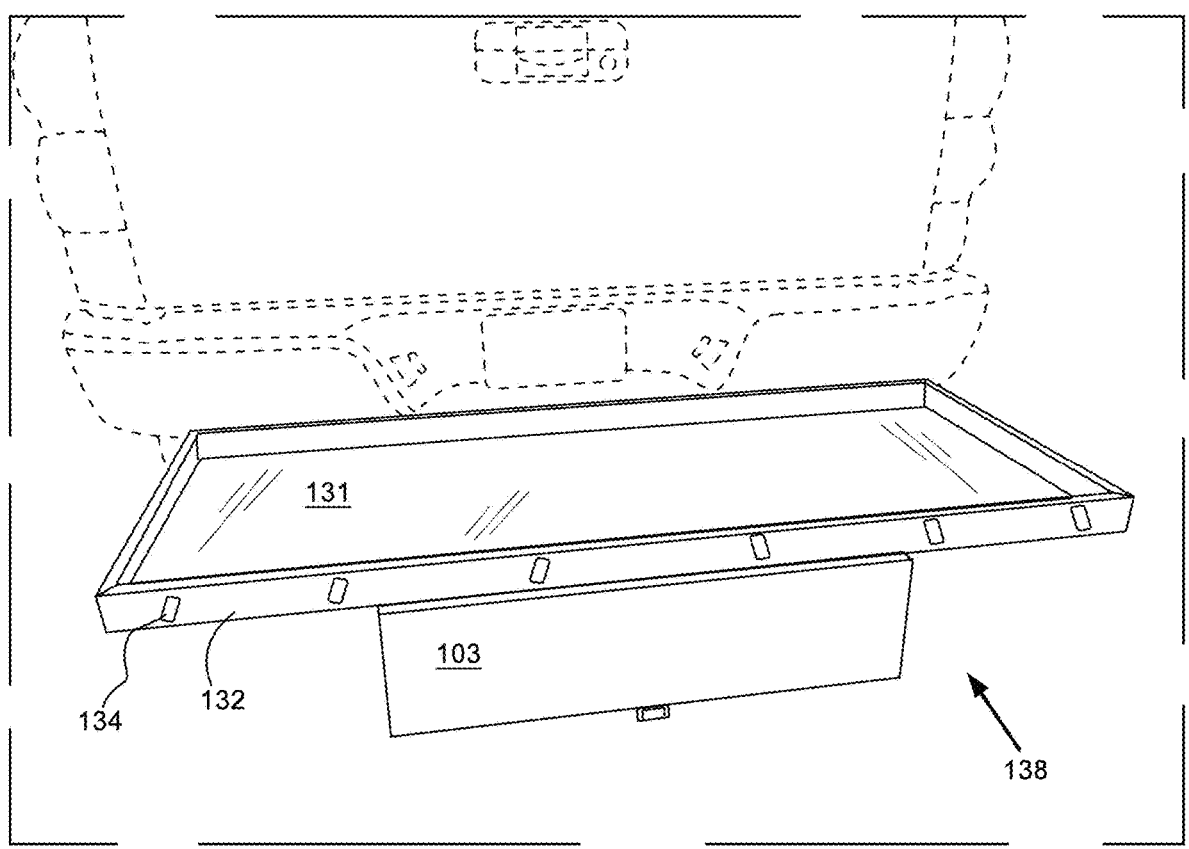
FIG. 18 is a perspective view of the mounted feed dispensing apparatus in a second position.

FIGS. 5 and 6 show respectively, a top plan and a bottom plan view of the spreader (100). FIG. 7 is a perspective view showing the feed spreader in an upright position with a mounting post (118) that can be used to mount the feed spreader to a receiver tube and is secured therein in the typical manner as a conventional ball mount, e.g., a lynch pin or ring pin (124) placed through the receiver tube and mounting post (118). FIGS. 8 and 18 show the feed spreader in a down position exposing platform surface (131) such that cargo can be readily transported without dismounting the spreader from the hitch.

Moving to FIGS. 9-12, mounting post (118) welded or otherwise affixed to the spreader hinge assembly (117) and is adapted to fit inside a hitch receiver tube and secured therein in the manner already described.

Figure 13:
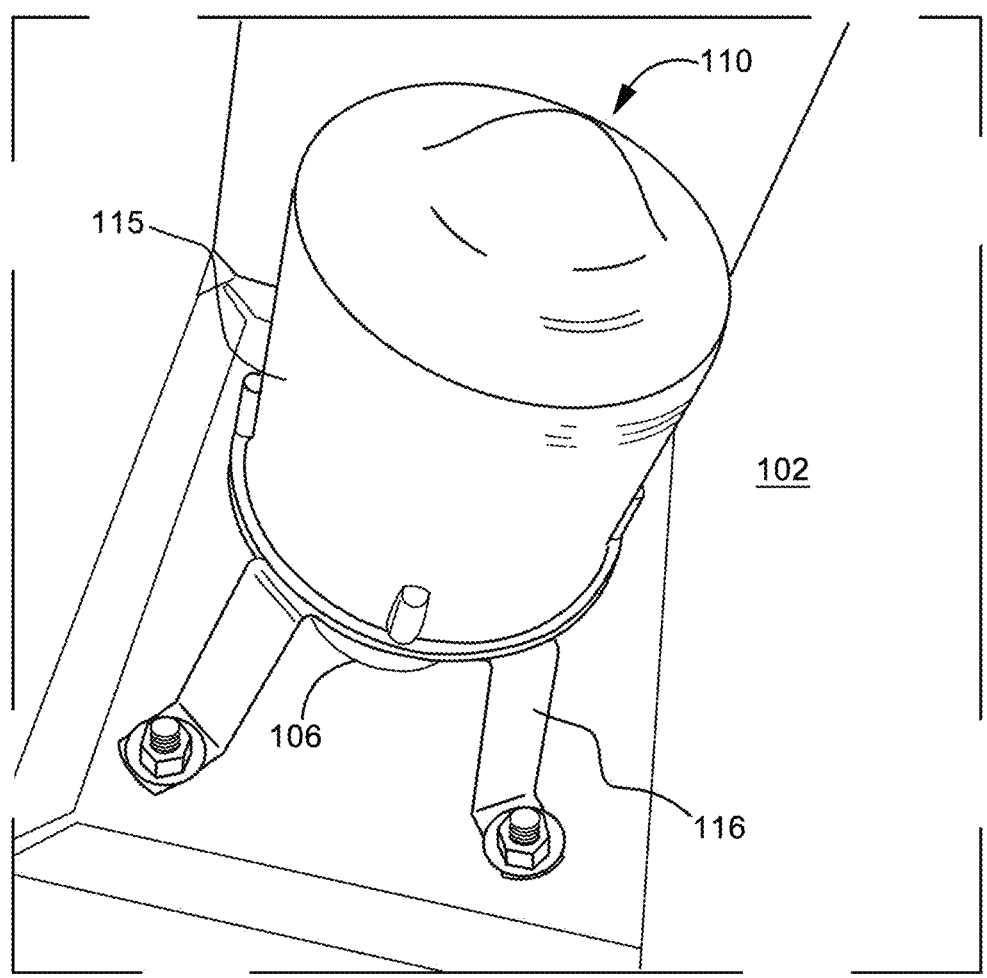
FIG. 13 is a perspective view looking down into the hopper portion interior.
Figure 14:
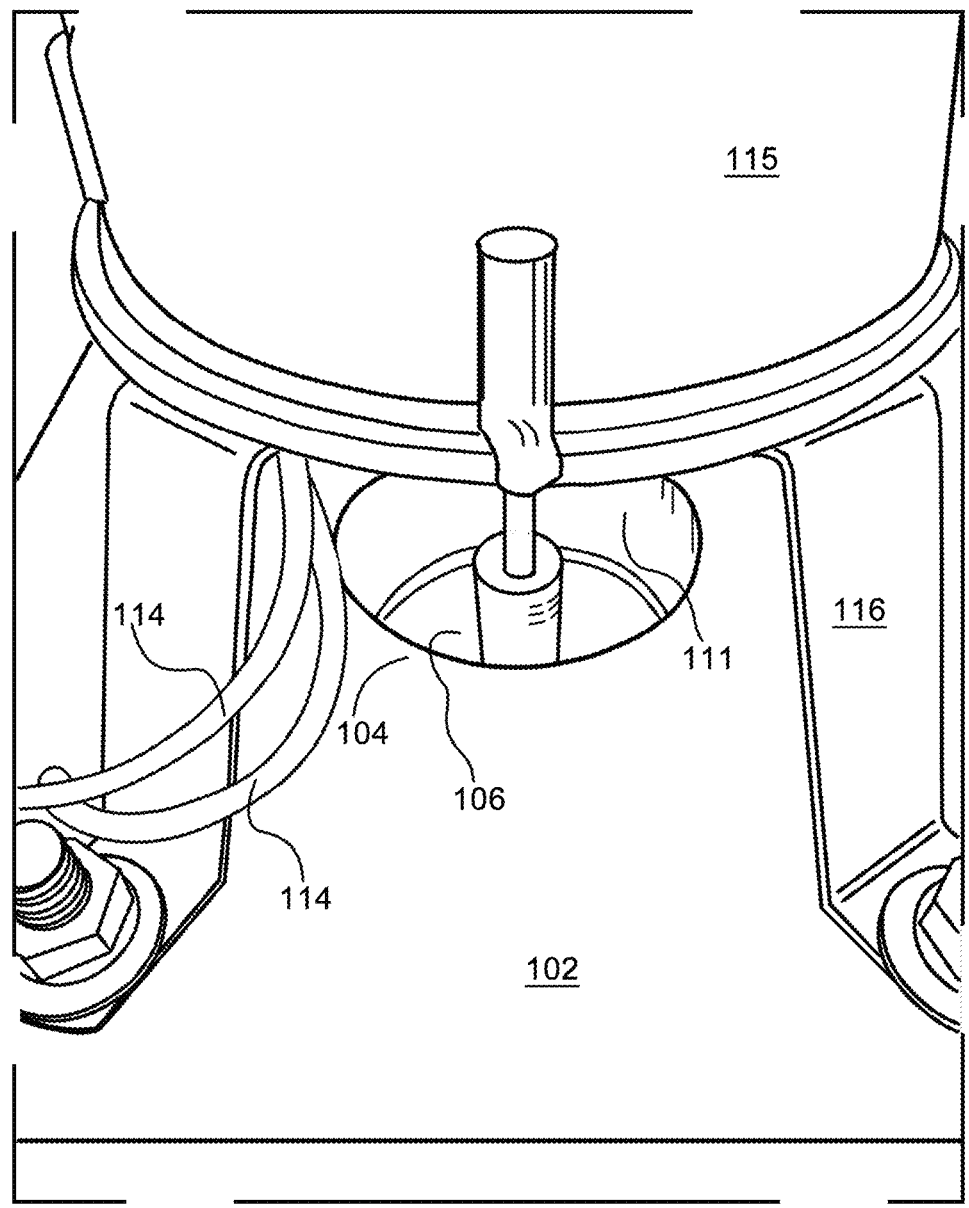
FIG. 14 is an enlarged detail view of the motor mounted to a floor of the hopper portion.
Figure 15:
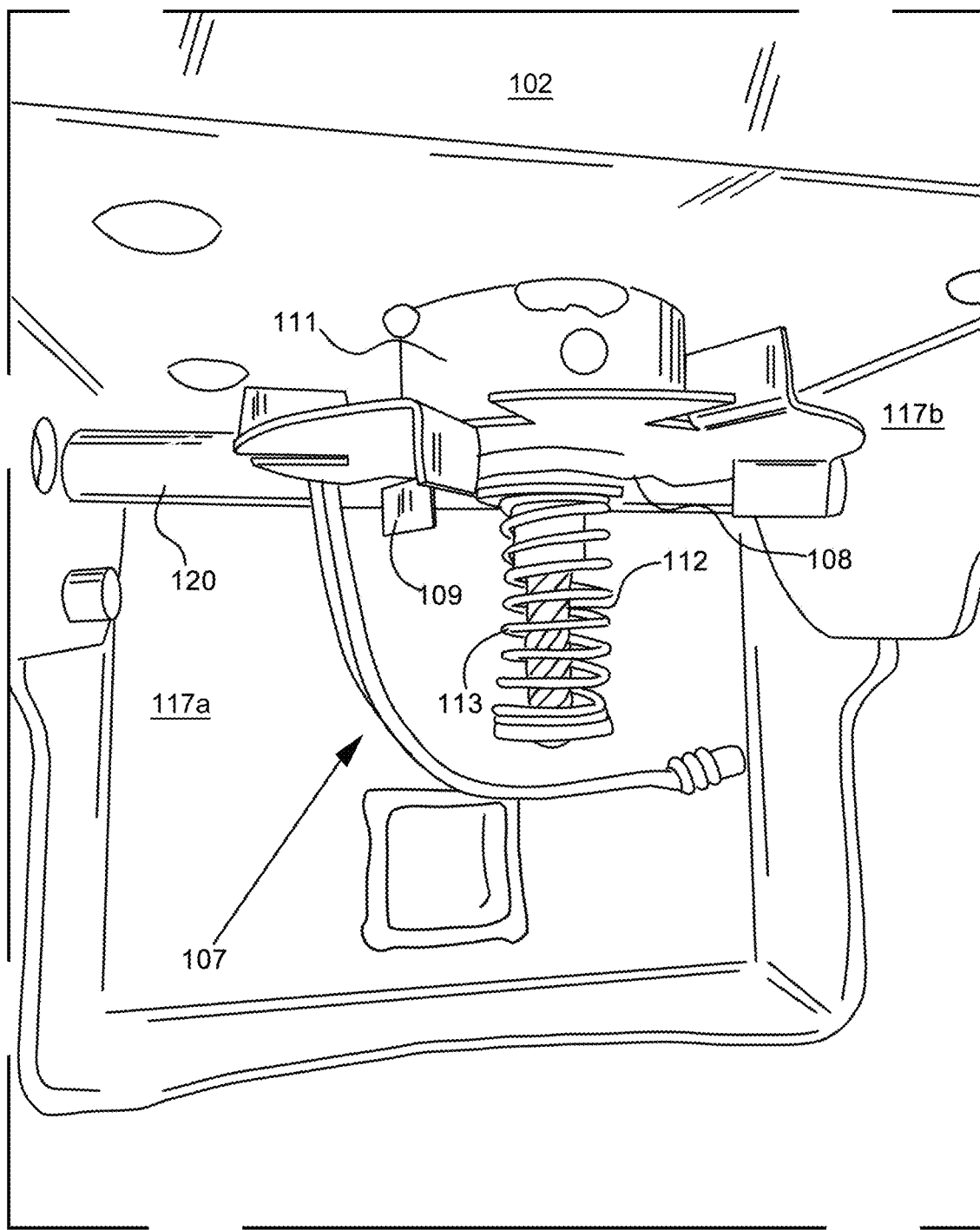
FIG. 15 is an enlarged detail view of a exterior spreading mechanism, aperture surround and disc spreader.
Figure 16:
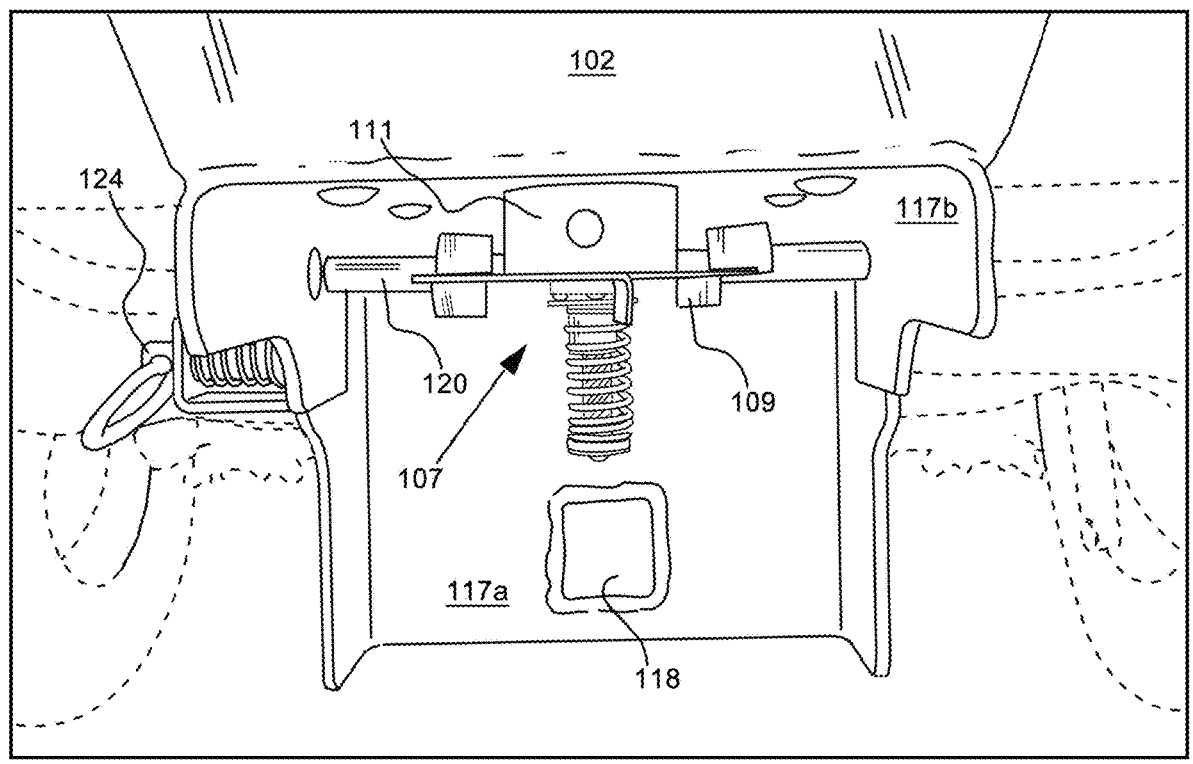
FIG. 16 is another detail view thereof.

FIG. 13 shows a floor of the hopper (100) interior that includes a shrouded (115) gate motor (110) and motor stand (116). FIG. 14 is an enlarged detail view showing the hopper outlet (104) gate member (106) and motor shaft. FIGS. 15 and 16 show feed outlet surround (111) and the exterior of the spreader mechanism (107) with motor screw (112), spring (113) and disc spreader (108) with fins (109).

FIG. 16 is an enlarged detail view showing the various elements of the hinge assembly (117) which includes a hinge pin (120) whereby leaves (117a, 117b) pivot. Also shown is hinge assembly securing pin (124) with a distal end of the pin engageable with a pair of coaxially alignable hinge apertures (119) which align when the pivotable leaf is moved in order to secure the hinge assembly in a desired position. Pin (124) is spring tensioned and is withdrawn in order to disengage the distal end and pivot the assembly to the alternate position.

Figure 17:
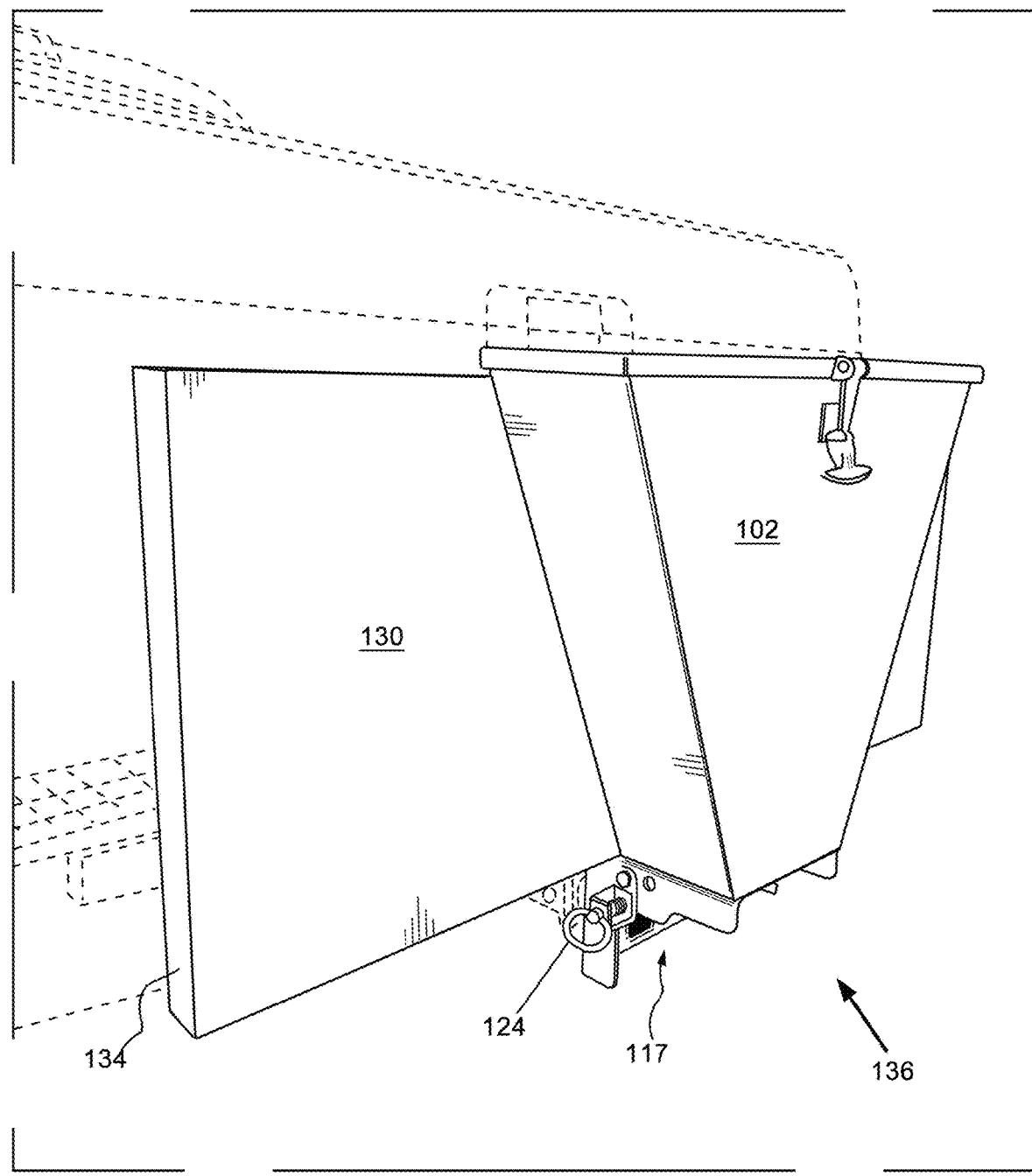
FIG. 17 is a perspective view of a mounted feed dispensing apparatus in a first position.

FIGS. 17 and 18 show the feed spreader (100) respectively in an upright and folded down position.

In cases where the feed spreader is substantially sheet metal, it is anticipated that relevant fabrication methods may include plasma cutting, stamping, welding, laser cutting, riveting, bending, bolting together by fasteners, etc. It is conceivable some implementations may be partially or entirely cast, injection molded or roto-molded using suitable polymer resins. Other applicable fabrication materials and methods will be appreciated by those having skill in the art.

Control of the feed spreader includes a controller, typically maintained in the cab of a vehicle and includes wired or wireless operation of the gate motor, opens and closes the feed outlet and rotates the disc spreader. Various arrangements of the foregoing elements are known in the art and utilized to distribute feed. Accordingly, any suitable combination of motors, feed outlet closures including valves, plugs or flaps, electronic controller(s) including one or more logic board(s), RF transceiver(s), and rotatable discs for control of the feed outlet and spread rate may be used in any of the implementations described herein.

It should be understood that the drawings and detailed description herein are to be regarded in an illustrative rather than a restrictive manner and are not intended to be limiting to the particular implementations, forms and examples disclosed. In the above-described embodiments and implementations, the size, shape and the like shown in the accompanying drawing figures can be adjusted and still remain within the scope of this disclosure. Accordingly, it is intended that this disclosure encompass any further modifications, changes, rearrangements, substitutions, alternatives, design choices, and implementations as would be appreciated by those of ordinary skill in the art and falling within the spirit and scope of the following claims.

What is claimed is:

1. A feed spreader comprising:
    a hopper portion including a feed outlet, a front side, back side, left side, right side and interior;
    a hinge assembly including a pivotable leaf joined to the hopper portion and pivotably connected to a fixed leaf, the fixed leaf attached to a mounting post adapted for insertion into a trailer hitch receiver tube;
    a transport surface joined to the hopper portion;
    the hopper portion securable in at least two positions: a first position wherein the hopper is upright and capable of dispensing feed and a second position at a right angle relative to the first position; and,
    in the second position the transport surface is horizontal and forms a cargo supportive platform portion.

2. The feed spreader according to claim 1 including a motor and rotatable disc adjacent to the feed outlet.

3. The feed spreader according to claim 1 including a raised border around the cargo supportive platform portion.

4. A method for installing and operating a feed spreader apparatus comprising the steps of:
    providing a feed spreader apparatus including a hopper portion with a feed outlet, a cargo supportive platform portion, a hinge assembly including a pivotable leaf, a fixed leaf attached to a mounting post adapted for insertion into a receiver of a vehicular hitch and, a transport surface joined to the hopper portion;
    mounting the feed spreader apparatus to the vehicular hitch;
    pivoting and securing the feed spreader in an upright position for dispensing feed or in a downwardly facing position at a right angle relative to the upright position wherein the transport surface forms a cargo supportive platform portion.

5. The method according to claim 4, wherein the platform portion is contiguous with a back side of the hopper portion.

6. The method according to claim 4, the feed spreader further including a motor and rotatable disc adjacent to the feed outlet.

7. The method according to claim 4, the cargo supportive platform portion further including a raised border.

\* \* \* \* \*